May 10, 1949. J. G. RITTER 2,469,932
ELECTRIC MOTOR FOR FOOD MIXERS OR THE LIKE
Filed Aug. 6, 1947 3 Sheets-Sheet 1
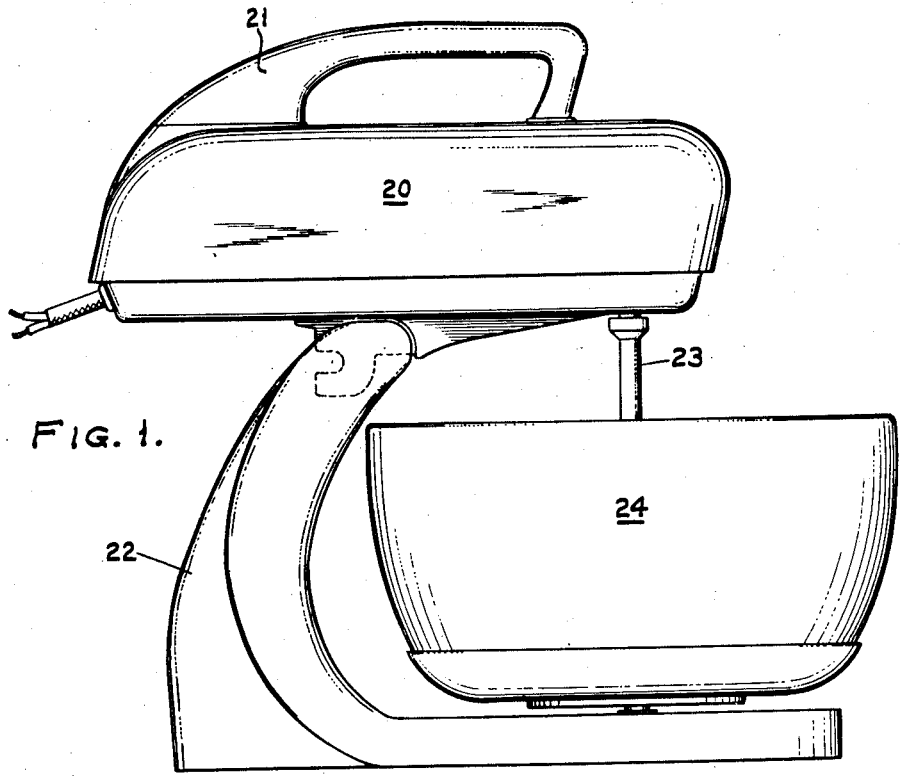
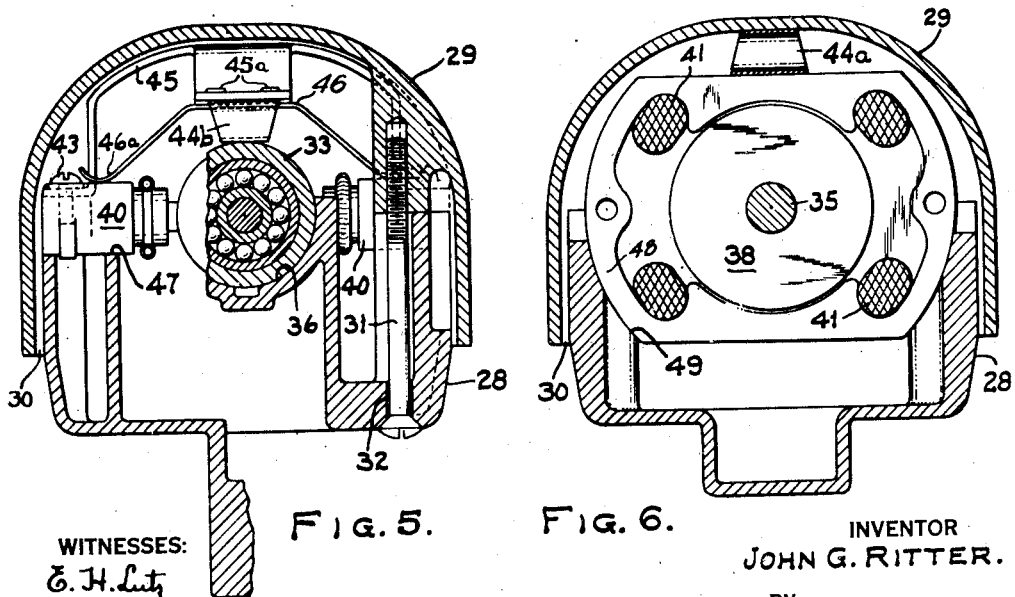
INVENTOR
JOHN G. RITTER.

May 10, 1949.  J. G. RITTER  2,469,932
ELECTRIC MOTOR FOR FOOD MIXERS OR THE LIKE
Filed Aug. 6, 1947  3 Sheets-Sheet 2

WITNESSES:
E. H. Lutz.
D. J. McCarty

INVENTOR
JOHN G. RITTER.
BY
ATTORNEY

May 10, 1949.  J. G. RITTER  2,469,932
ELECTRIC MOTOR FOR FOOD MIXERS OR THE LIKE
Filed Aug. 6, 1947   3 Sheets-Sheet 3
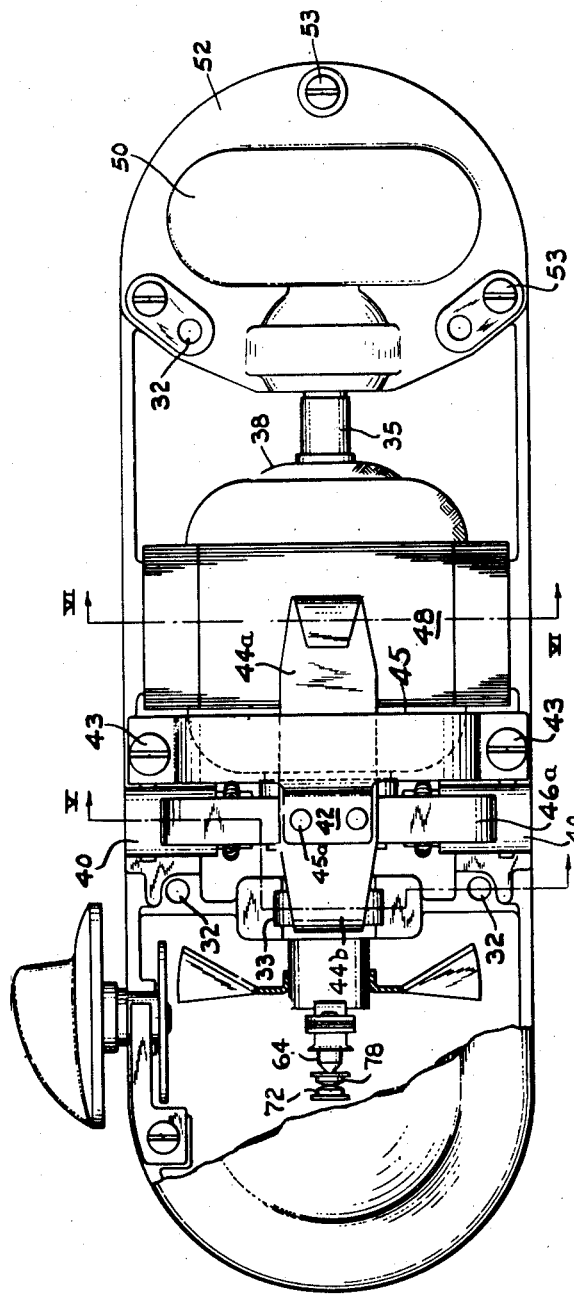
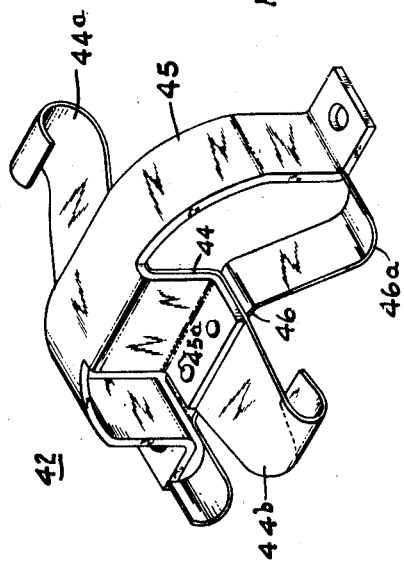
WITNESSES:
E. H. Lutz
D. J. McCarty
INVENTOR
JOHN G. RITTER.
BY W. J. Eisinger
ATTORNEY Patented May 10, 1949

2,469,932

UNITED STATES PATENT OFFICE 2,469,932

ELECTRIC MOTOR FOR FOOD MIXERS OR THE LIKE

John G. Ritter, Springfield, Mass., assignor to Westinghouse Electric Corporation, East Pittsburgh, Pa., a corporation of Pennsylvania Application August 6, 1947, Serial No. 766,774

7 Claims. (Cl. 172—36)

This invention relates to electric motors, and relates more particularly to electric motors for kitchen utility appliances known generally as "food mixers."

In prior food mixers, the speed controls and other components of the motors could not be observed, tested and adjusted in operation for the reason that their mechanisms were held in place by enclosing covers without which the motors could not be operated, and with which in place, access to the mechanisms was prevented.

An object of this invention is to support the internal components of electric motors such as are used in food mixers, in operating positions without the use of supporting covers whereby observations, tests and adjustments of the components can be made with the motors in operation.

A feature of this invention resides in dividing the casing of an electric motor for a food mixer into longitudinally extending upper and lower parts, providing seats for the bearings of the motor shaft and for the stator core and the motor brush supports in the lower casing part, providing a spring bracket attachable to the lower casing part for holding one of the bearings, the brush supports and the motor stator in their seats, and providing a spring member clamped under the gear chamber cover of the motor for holding the other bearing in its seat. This enables the motor to be operated without the upper casing part being used.

The invention will now be described with reference to the drawing, of which:

Fig. 1 is a side elevation of an assembled food mixer embodying this invention;

Fig. 3 is a plan view looking downwardly upon the motor with the upper casing part removed;

Fig. 4 is a perspective view of the spring bracket used for holding the brush supports, a bearing, and the stator in their respective seats;

Fig. 5 is a sectional view along the line V—V of Fig. 3; and,

Fig. 6 is a sectional view along the line VI—VI of Fig. 3.

Figure 2:
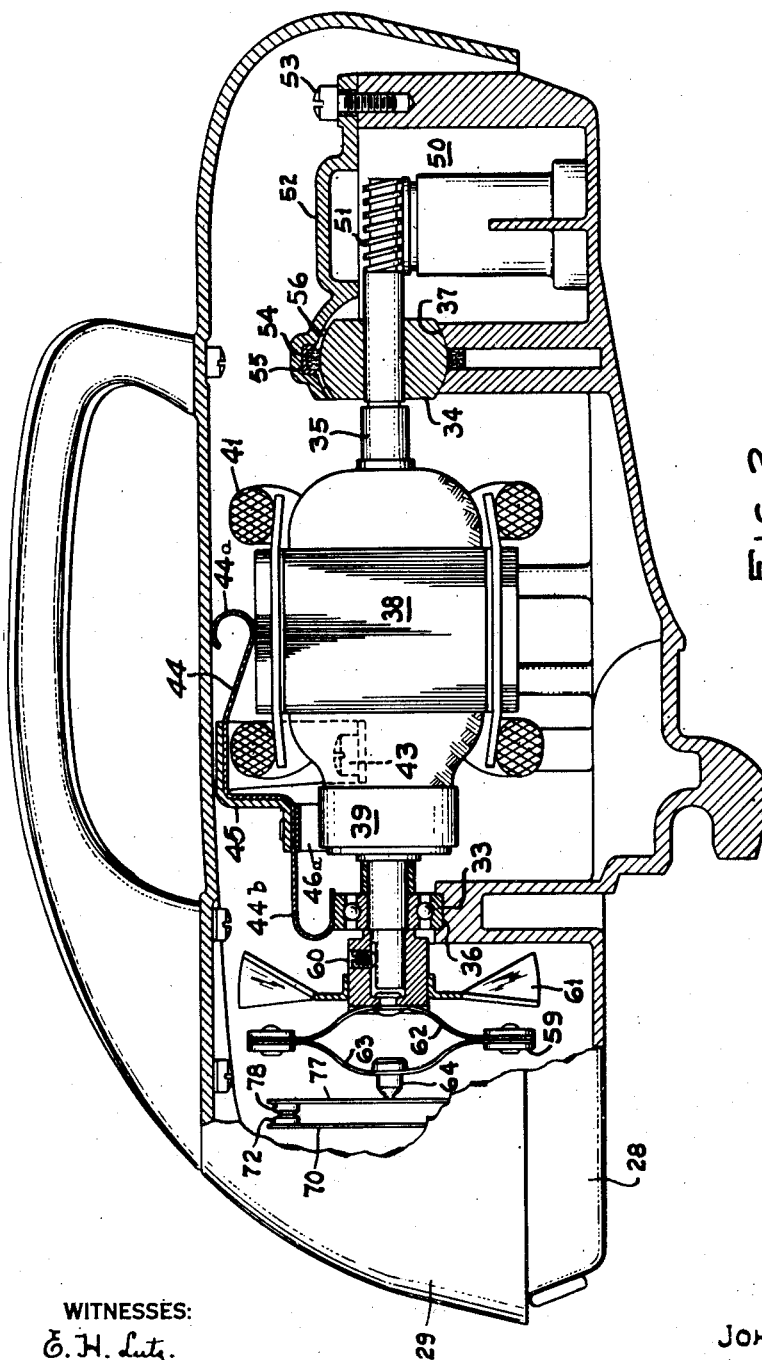
Fig. 2 is a side elevation, in section, of the motor unit of Fig. 1.

The mixer illustrated by Fig. 1 comprises an electric motor 20 having the handle 21, pivotally mounted on the base 22. The motor has a conventional pair of spindles 23, only one of which is seen in Fig. 1, extending downwardly into the mixing bowl 24.

With reference to Figs. 2, 3, 5 and 6, the casing of the motor of Fig. 1 is divided into a lower casing part 28 and an upper part 29 which is slightly wider and longer than the part 28, thereby providing therebetween an air passage 30 which extends between the two parts when same are assembled together. The screws 31 (Fig. 5) which extend through the openings 32 (Fig. 3) in the lower casing part 28, and are threaded in tapped openings in the upper casing part 29, serve to hold the upper and lower casing parts together. Each of the casing parts 28 and 29 is of such construction as to permit the casting of all interior surfaces.

The bearings 33 and 34 of the motor shaft 35, are seated in the bearing seats 36 and 37 formed in the lower casing part 28. The motor armature 38 having the commutator 39 is attached to the shaft which is supported in the bearings. The motor stator core or field magnet 48 having the field windings 41, extends around the armature 38. The brushes of the commutator 39 extend through the brush supports 40.

The spring bracket 42, shown more fully in Fig. 4, comprises the relatively stiff or rigid member 45, and the two spring members 44 and 46 disposed transversely of each other and secured to the member 45 by means of the rivets 45a. The bracket 42 is adapted to be attached to the lower casing part 28 by the screws 43 extending through openings in the ends of the part 45. The spring member 44 provides the spring extension 44a which bears downwardly upon and holds the motor stator core 48 in its seat 49 formed in the casing part 28, and at its other end it is provided with a spring extension 44b which bears downwardly upon the bearing 33 and holds it against its seat 36. The spring member 46 extends transversely of the motor and provides the spring extensions 46a which bear downwardly upon the brush supports 40 and hold them against their seats 47.

The lower casing part 28 has a gear chamber 50 which contains conventional gearing for driving the spindles of the food mixing and juice extracting mechanisms, which gearing for simplicity of illustration is not shown, and which is adapted to be driven by the worm gear 51 on one end of the shaft 35. The cover 52 for the gear chamber 50 is attached to the lower casing part 28 by the screws 53.

The bearing 34 has the annular member 54 of felt, extending therearound, and the spring member 55 is seated upon the felt member 54, and has the four spring extensions 56 in contact with the bearing 34 (Fig. 2). The gear chamber cover 52 contacts the upper surface of the spring member 55 and forces it downwardly whereupon the spring extensions 56 force the bearing 34 against its seat 37 (Fig. 2).

The motor shaft 35 has attached to its other end, the hub 60 having the fan blades 61 mounted thereon. The center of the governor spring strip 62 is attached to the outer end of the hub, and is attached at its ends to the ends of the similar spring strip 63, the strips being bowed apart between their ends as illustrated by Fig. 2. The contact-closing member 64 is attached to the center of the strip 63. The strips 62 and 63 have the weighted washers 59 attached to their ends.

The speed governor includes the movable contact 78 carried by the spring arm 77 and the relatively stationary contact 72 carried by the arm 70. The spring arm 77, when the member 64 is retracted, moves the contact 78 out of engagement with the contact 72.

The speed governor operates in a well known manner. Upon increase in speed, centrifugal force pulls the weighted washers 59 apart, causing the spring strips 62 and 63 to tend to straighten and move the member 64 to the right, permitting the arm 77 to open the contacts to deenergize the motor. Upon decrease in speed, the spring force of the spring strips 62 and 63 moves the member 64 to the left to reclose the contacts and reenergize the motor. Thus, the speed of the motor is held close to the desired speed by deenergizing the motor as soon as the desired speed is exceeded and energizing the motor when the desired speed is not obtained.

In assembling the motor, the gearing is placed in the gear chamber 50, and then the motor shaft, its bearings, the rotor, the stator core and the fan hub with its blades and the governor spring strips it supports, are placed in the lower casing part with the worm gear 51 engaging its associated gearing in the chamber 50, and with the bearings and the stator core engaging their seats. The gear chamber cover 52 is then placed over the gear chamber and the screws 53 tightened down. This causes the spring extensions 56 of the spring member 55 to press against the bearing 34 holding same in its seat 37. The brush supports 40 are then placed in their seats in the lower casing part, and the spring bracket 42 is then attached by the screws 43 to the lower casing part, causing the spring extension 44a of the bracket to bear downwardly upon and hold the motor stator core 48 securely in its seat 49; causing the spring extension 44b to bear downwardly upon the bearing 33 holding same in its seat 36, and causing the spring extensions 46a to bear downwardly upon and hold the brush supports 40 in their seats 47.

Since the upper casing part 29 is not required for the operation of the motor, access to its components is available, and their operation can readily be observed, and they can be tested and adjusted under operating conditions while observing their performance. This feature is particularly important in connection with the testing and adjusting of the governor components. Another advantage of this construction is that the operation of the motor is quieter than in prior constructions in which covers were used to hold the motor components in place, and to which vibrations and noise were transmitted, the covers acting as sounding bells.

The fan blades 61, when the motor is operated, draw in and discharge air through the passage 30 between the two casing parts, the fan blades being arranged to draw air over the contact assembly, and to blow air over the rotor and stator.

While one form of the invention has been described for the purpose of illustration, the invention is not so limited, as modifications may be made by those skilled in the art without departing from the spirit of the invention.

What I claim is:

1. A motor comprising a rotor having a rotary shaft extending longitudinally of the motor, a bearing on the shaft, a stator core around the rotor, a casing around the stator core, the casing being divided into first and second longitudinally-extending parts, the first of the parts having formed therein seats for the bearing and the stator core, and a spring-supporting member attached to the first casing part, said member having springs contacting said bearing and said stator core for holding same in said seats, and means for securing said casing parts together.

2. A motor comprising an armature having a rotary shaft extending longitudinally of the motor, a commutator for the armature, brush holders for the brushes of the commutator, a bearing on the shaft, a casing divided into first and second longitudinally extending parts, the first of said parts having formed therein seats for said bearing and said holders, a spring-supporting member attached to said first casing part, said member having springs contacting said bearing and said holders for holding same in said seats, and means for securing said casing parts together.

3. A motor according to claim 2 in which the armature has a stator core therearound, the first casing part has a seat formed therein for the stator core, and the spring-supporting member has a spring contacting the stator core for holding same in its seat.

4. A motor comprising an armature, a commutator for the armature, brush holders for the brushes of the commutator, a stator core, a casing divided into first and second longitudinally extending parts, a spring-supporting member attached to the first casing part, said first casing part having seats formed therein for said stator core and said holders, said member having springs contacting said holders and said stator core for holding same in said seats, and means for securing said casing parts together.

5. A motor comprising a rotor having a rotary shaft extending longitudinally of the motor, a pair of bearings on the shaft, a stator core around the rotor, a casing around the stator core, said casing being divided into first and second longitudinally extending parts, the first of said parts having formed therein seats for said bearings and said stator core and having formed therein a gear chamber adjacent one of the bearing seats, a bracket attached to said first casing part, said bracket having springs in contact with said stator core and one of said bearings for holding same in their seats, a spring member in contact with the other of said bearings, a cover for said chamber extending over said member and pressing same against said other of said bearings for holding same in its seat, and means for securing said casing parts together.

6. A motor comprising an armature having a rotary shaft extending longitudinally of the motor, a pair of bearings on the shaft, a commutator for the armature, a stator core around the armature, brush holders for the brushes of the commutator, a casing divided into first and second longitudinally extending parts, the first of said parts having seats formed therein for said bearings, for said stator core and for said holders, and having a gear chamber formed therein adjacent one of the bearing seats, a bracket attached to said first casing part, said bracket having springs in contact with said holders, said stator core and one of said bearings, a spring member in contact with the other of said bearings, a cover for said chamber extending over said member and pressing same against said other bearing for holding same in its seat, and means for securing said casing parts together.

7. A motor comprising an armature having a rotary shaft extending longitudinally of the motor, a pair of bearings on the shaft, a commutator for the armature, brush holders for the brushes of the commutator, a casing divided into first and second longitudinally extending parts, the first of said parts having seats formed therein for said bearings and for said holders, and having a gear chamber formed therein adjacent one of the bearing seats, a bracket attached to said first casing part, said bracket having springs in contact with said holders and one of said bearings for holding same in their seats, a spring member in contact with the other of said bearings, a cover for said chamber extending over said member and pressing same against said other bearing for holding same in its seat, and means for securing said casing parts together.

JOHN G. RITTER.

REFERENCES CITED

The following references are of record in the file of this patent:

UNITED STATES PATENTS

| Number | Name | Date |
|---|---|---|
| 2,286,993 | Naul | June 12, 1942 |